United States Patent [19]

Bernard

[11] Patent Number: 4,908,503

[45] Date of Patent: Mar. 13, 1990

[54] ARTICLE FOR IDENTIFYING PIECES OF TIMBER

[76] Inventor: Leuvrey Bernard, 20-rue de la scierie-(8p2), 70280-Raddon, France

[21] Appl. No.: 153,452

[22] Filed: Feb. 8, 1988

[30] Foreign Application Priority Data

Feb. 11, 1987 [FR] France ................................ 87 01700

[51] Int. Cl.4 ........................................ G06K 21/00

[52] U.S. Cl. ........................................ 235/489; 235/487

[58] Field of Search .................... 235/489, 487; 40/626

[56] References Cited

U.S. PATENT DOCUMENTS

| | | | |
|---|---|---|---|
| 2,154,959 | 4/1939 | Roosie | 40/626 |
| 3,707,300 | 12/1972 | Tamburro | 40/626 |
| 4,268,986 | 5/1981 | Piana | 40/626 |
| 4,523,088 | 6/1985 | Utsch | 235/489 |

FOREIGN PATENT DOCUMENTS

| | | | |
|---|---|---|---|
| 3346294 | 6/1984 | Fed. Rep. of Germany | 40/620 |
| 3611151 | 8/1987 | Fed. Rep. of Germany | 40/626 |

*Primary Examiner*—Harold I. Pitts

*Attorney, Agent, or Firm*—Mason, Fenwick & Lawrence

[57] ABSTRACT

An identification device, especially a plate for identifying articles, particularly pieces of rough timber, comprising a flat rigid support (1), to which are affixed information marks (2) visible from the outer face (3) of the supports (1), the inner face (4) of the support (1) generally being arranged against the article to be identified, the device being such that, in combination, on the one hand the information marks (2) are located in the direction of the inner face of a flat element (5) forming part of the device, and on the other hand the element (5) is joined rigidly against the outer face of the support (1) and is transparent, at least opposite the information marks (2); in this way, the information marks (2) are both recognized from the outer face of the identification device and protected against external attack.

An information-processing device composed of the said identified device combined with an appliance for reading the information marks (2), and method of identification from the said information-processing device.

14 Claims, 2 Drawing Sheets

ARTICLE FOR IDENTIFYING PIECES OF TIMBER

FIELD OF THE INVENTION

The invention relates to an identification device, especially an identification plate, making it possible to identify articles and more particularly pieces of rough timber.

Rudimentary methods of marking pieces of rough timber, such as marking by paint or by pencil, are already known.

More elaborate methods involving plates made of metal or colored plastic are also known. These plates have projecting parts embedded in the wood and, on their outer face, figures and/or letters.

Thus, Austrian Patent No. 289,859 describes aluminum or plastic plates in which magnetic powder can be incorporated.

British Patent No. 2,075,464 describes a marking plate made of plastic, with magnetic powder injected, or made of aluminum or iron, having on its inner face projecting parts embedded in the wood and on its outer face extensions making it possible to secure a special hammer for fitting the plate.

U.S. Pat. No. 3,673,717 also relates to a conventional plastic marking plate having figures and/or letters on its outer face.

All these plates have, in general, the following main disadvantages:

The metal plate oxidizes, blunts the wood-cutting tools and has a limited surface for presenting the identification marks.

As for plastic plate, this does not blunt the cutting tools and is highly legible; however, combination with the conventional marking system, namely for example, identification by printing with a film transferred hot onto the outer face, does not enable the user to put the identification into effect quickly and easily.

SUMMARY OF THE INVENTION

The present invention aims to overcome these disadvantages. A first object of the invention is to put an identification device into effect in the most efficient possible way by using information marks of the bar-code type.

This first object is linked to the achievement of a second object of the invention, namely the protection of the information marks against external attack and recognition of these from the outer face of the identification device.

For this purpose, the invention provides an identification device, especially a plate for identifying articles, particularly pieces of rough timber, of the type comprising a flat rigid support, to which are affixed information marks visible from the outer face of the support, the inner face of the support generally being arranged against the article to be identified, the device being such that, on the one hand, the information marks are located in the direction of the inner face of a flat element forming part of the device, and on the other hand this flat element is joined rigidly to the support and is transparent, at least opposite the information marks.

The invention also relates to a device for processing the information given by the said identification device, formed by the combination of the said identification device, fitted on each article to be identified and comprising marks of the bar-code type, and of a reading appliance of the bar-code type.

Finally, the invention relates to an identification method intended for storing information corresponding to various articles and making use of the identification device described and the information-processing device.

The invention is aimed, first of all, at making it possible to use bar-code marks for plates for identifying articles, such as pieces of rough timber. This special use of bar-code marks essentially presents a problem as regards the protection of the marks from the external environment, in view of the conditions under which the pieces of timber are stored, transported and, more generally, treated. This problem does not arise when bar-code marks are used on stored packs conventional in large stores, such as food products, cosmetic products, etc., since they are not subject to attack (rain, fungi, knocks, etc.) to which pieces of timber are subject.

Consequently, the present invention is aimed at making use of means providing a satisfactory solution to this problem of protecting the bar-code marks against external attack in this use or in any other equivalent.

Furthermore, the use of these bar-code marks makes it possible to express a statement which is more complex than a simple combination of a few figures or letters and which can be processed by data-processing means.

BRIEF DESCRIPTION OF THE DRAWINGS

The other characteristics and advantages of the invention will emerge from the following description, with reference to the accompanying drawings in which.

DESCRIPTION OF THE PREFERRED EMBODIMENTS

Figure 1:
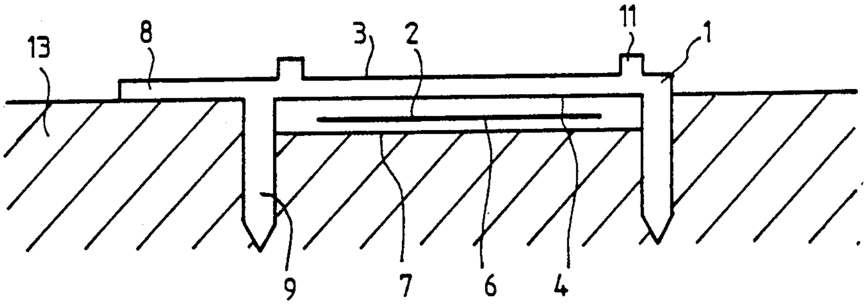
FIG. 1, is a cross-sectional view of a first embodiment of the invention.

The invention relates to an article identification device comprising, on the one hand, a flat rigid support 1 and, on the other hand, information marks 2 joined rigidly to the support 1 and visible from the outer face 3 of the support 1 opposite the inner face 4 generally arranged against the article to be identified, in such a way that the device is fastened rigidly to the said article.

This general structure of such an identification device known as an identification plate is well known to a person skilled in the art who specializes in wood (forestry, sawmills, conversion, trading).

The invention relates to the identification of all forms of wood, that is to say trees, pieces of rough timber, converted timber, pallets, crates, etc. The identification device is generally fastened rigidly to the cut face of the wood 13.

However, the identification device can also be used in a different way, namely arranged at the bottom of a cavity provided for this purpose in the wood. This use is easy to put into practice, since the identification can be jammed in the cavity as a result of force-fitting, without additional fastening means.

This identification device can also be used on articles of a different type from wood. Likewise, if it is arranged at the bottom of a cavity, the latter can be a lock, this lock being released by means of a special key matched to the information marks 2 of the identification device.

Finally, this identification device can be multiple, namely be formed by fitting several identification devices in the form of plates next to one another against the article to be identified. In this case, each identification plate has a single information mark 2, and the operator can thus himself compose the identification statement which is to be affixed to the said article to be identified.

According to the invention, the device comprises, in combination, on the one hand information marks 2 located in the direction of the inner face of a flat element 5 forming part of the device, and on the other hand this element 5 joined rigidly to the support 1 against its outer face 3 and transparent, at least opposite the information marks 2. The simultaneous effect of this combination is to make it possible to recognize the marks 2 from the outer face of the identification device and to ensure that they are protected against external attack, namely rain, snow, mud, knocks, etc.

The information marks 2 mentioned here refer generally to a suitable marking in the form of lines and/or figures and/or letters and/or shapes, flat and/or in relief, projecting and/or recessed, attached and/or produced with the element 5, of a color different from that of the bottom of the element 5 to obtain a contrast, or not.

In the particular case where the identification device is composed of several identification devices in the form of plates placed next to one another, the information marks 2 are then formed by a single code or figure or letter of a size larger than or equal to 19 millimeters and of a color which is fluorescent or not. In this way, the resulting identification statement of this multiple identification device can be seen from a distance.

The information marks 2 affixed to the identification device are preferably of the sequential numbering type or of the bar-code type known per se. In this case, the barcodes are formed by transverse bars aligned next to one another.

The element 5 is transparent either over its entire surface or only partially and opposite the information marks 2.

Figure 2:
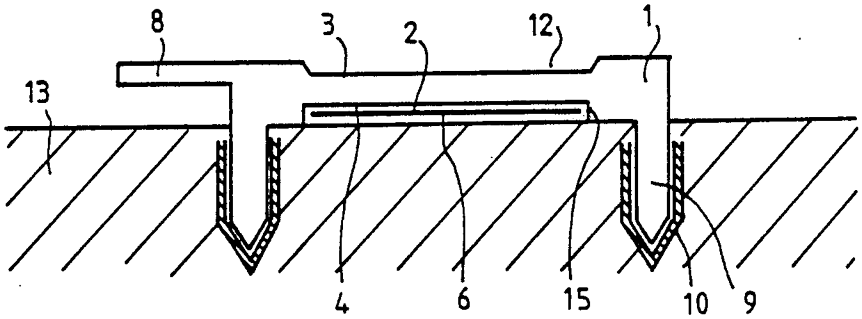
FIG. 2 is a cross-sectional view of a second embodiment of the invention.

In a first preferred embodiment of the invention (FIGS. 1 and 2), the element 5 comprises the support 1 itself, the element 5 and the support 1 forming one and the same piece. In this case, the information marks 2 can be joined rigidly to the support 1 directly on its inner face 4, in particular affixed to it.

Figure 3:
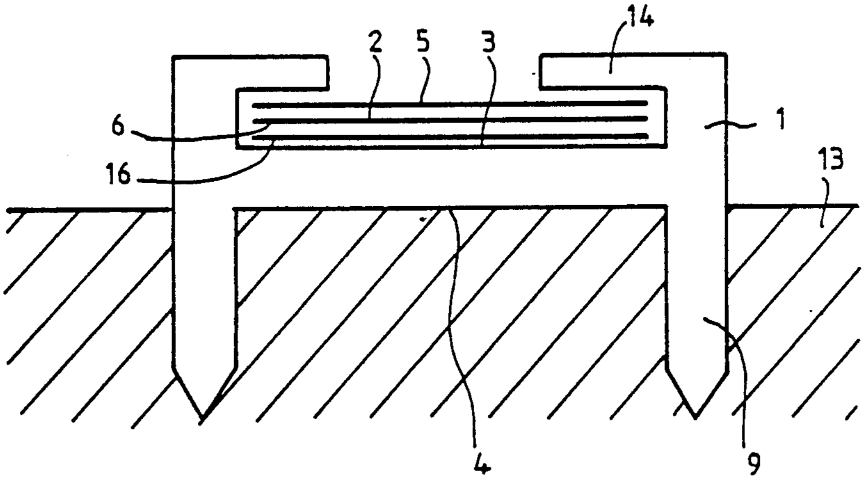
FIG. 3 is a cross-sectional view of a third embodiment of the invention.

In a second embodiment of the invention (FIG. 3), the element 5 is separate from the support 1 and joined rigidly to the latter against its outer face. In this case, the element 5 is joined rigidly to the support 1 either by welding or by means of the turned-down edge 14 of the support 1 which traps the element 5 or, finally, by any other suitable method (FIG. 3).

In this second embodiment (FIG. 3), since the element 5 and the support 1 are separate from one another, the support 1 is not necessarily transparent. The support 1 is made of metallic material or plastic having fine particles of iron distributed uniformly in its mass. These iron particles make it possible to fasten the device to a hammer, the head of which comprises a magnet and on which the device is applied for the laying of the all-steel plates. They also make it possible to fasten the identification device directly, that is to say without any special fastening means, to any article having a magnetized part. Moreover, this metaloplastic version of the identification device has the advantage that it can be detected by a metal-particle detector, particularly during the production of paper pulp, the latter being contaminated by the plastic.

According to the invention, when the element 5 and the support 1 are separate from one another (the second embodiment), the information marks 2 can be located directly on the outer face 3 of the support 1.

However, whether the element 5 and the support 1 are separate or not, the information marks 2 are preferably located on an additional flat support 6 joined rigidly under and against the inner face of the element 5.

This additional support 6 preferably comprises a label. This label can be made of paper or any other material insensitive to attack by water or various chemical agents. The additional support 6 is joined rigidly to the inner face of the element 5 by the addition of an adhesive agent either to the marking face of the additional support 6 or to the inner face itself of the element 5, the latter then being formed by the support 1 itself.

If the inner face of the element 5, then formed by the support 1, has an adhesive agent, the user can put the additional support 6 in place himself at the last moment and, for example, note the figures or other particulars manually on the additional support 6, this not being possible if the additional support 6 itself has an adhesive agent on its marking face. In particular, a possible use of this embodiment of the identification device is for label-holders designed, for example, for keyholders, the user sticking the label, after noting its particulars, to the inner face of the support made of transparent plastic.

However, the additional support 6 preferably has at least one adhesive on its marking face.

According to the invention, the additional support 6 can also have an adhesive agent on its two faces.

In the preferred embodiment in which the element 5 and the support 1 are not separate from one another, the unmarked face of the additional support 6 having an adhesive agent can be associated with an additional protection of the type comprising a plastic film 7 transparent or not. The additional support 6 is then trapped sealingly, together with its information marks 2, between the inner face of the support 1 and the plastic film 7.

Likewise, when the element 5 and the support 1 coincide with one another (FIG. 2), the support 1 can have a clearance or receptacle 15 for the additional support 6, to which the information marks 2 are affixed, so as to set them apart from the article to be identified and thus protect them against friction or violent contact with the wood in the event of knocks or excessive handling from outside.

One possible use of this technique is for checking badges in particular. The use of this type of receptacle 15 defined above makes it possible both to simplify the badge and provide the possibility of removing the badge immediately, the label incorporating the statement, or of affixing the statement easily and quickly when a badge is instantaneously allocated.

Finally, according to the invention, when the support 1 and the element 5 are separate or not, the support 1 being made of a metallic material different from iron, a thin iron sheet 16 can be placed between the support 1 and the element 5 associated with the additional support 6. This embodiment makes it possible to fix the identification device as a whole to a magnetized hammer, as mentioned above.

Figure 4:
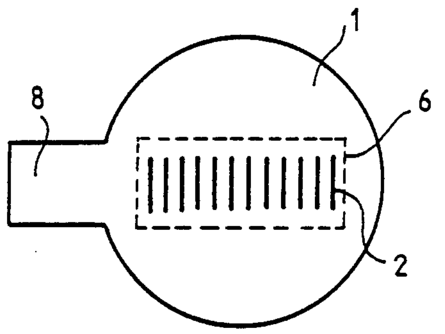
FIG. 4 is a plan view of the device according to the invention.

It is necessary for the support 1 to be made of metallic material when articles of considerable hardness are to be identified, so that greater resistance can be offered during the embedding of the identification device. According to the invention, the support 1 can have a manual holding tongue 8 (FIG. 4). The tongue 8 is made of the same material as the support 1 and forms a flat extension towards the outside of the support 1. In the known case of the plates which are clipped to a hammer by means of several small tags fastened to the outer face of the plates, it is necessary to use a special hammer.

The holding tongue 8 according to the invention does not require the use of special tools and makes it possible to hold the identification device with the hand, whilst at the same time protecting it from the hammer knocks during the fitting of the device. In fact, the holding tongue 8 is located outside the striking zone of the hammer.

Figure 5:
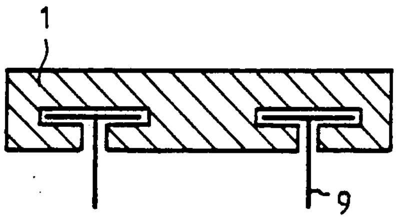
Figure 8:
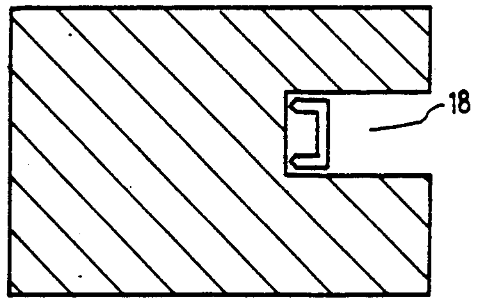
FIG. 8 is a cross-sectional view of the device inside a cavity.
Figure 6:
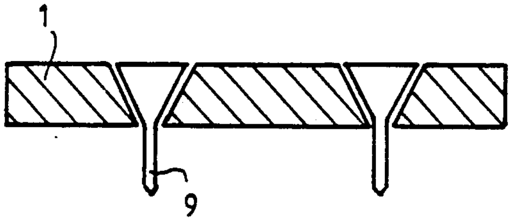

According to the invention, the identification device can also have a fastening part 9 embedding itself forcibly in the article to be identified. This fastening part 9 is preferably continuous, produced from the same material as the support 1 and formed by an extension projecting transversely inwards from the outer edge of the inner face 4 of the support 1, thus defining a closed space. In an alternative embodiment, the fastening part 9 can be composed of several separate elements (FIGS. 5 and 6) joined rigidly under the inner face 4 of the support 1.

Preferably, the lower end of the fastening part 9 is cut in the form of a bevel to make it easier to embed it in the article to be identified.

Figure 7:
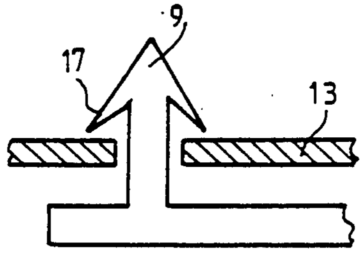
FIGS. 5, 6 and 7 are detailed views of the support 1 equipped with the fastening elements 9.

However, this lower end of the fastening part 9 can also be arrow-shaped (FIG. 7), that is to say equipped with lateral extensions 17 performing a nonreturn function when the article to be identified is hollow.

When the fastening part 9 is composed of separate elements, there are at least two elements inserted in the support 1.

In a particular embodiment (FIG. 5), the fastening part 9 is composed of tabs inserted by means of crimping in the inner face 4 of the support 1.

In another particular embodiment (FIG. 6), the fastening part 9 is composed of nails passing through holes made in the support 1 for this purpose.

When the article to be identified is of considerable hardness, the fastening part 9 can have a metal reinforcement 10 (FIG. 2) increasing the hardness of the material forming the fastening part 9. This metal reinforcement 10 of a thickness of the order of a few tenths of a millimeter is joined rigidly against the outer surface of the fastening part 9.

Whether the element 5 and the support 1 are separate or not, the fastening part 9 is preferably produced in the same material as the support 1 itself.

However, when the fastening part 9 is composed of several elements separate from the support 1, these, since they have to be more resistant, are generally made of metallic material or a plastic of considerable hardness.

The identification device according to the invention can also have arrangements of the type comprising a protective rib 11 (FIG. 1) on the outer face 3 of the support 1. The effect of these ribs 11 is to delimit a recess, at the bottom of which are located the information marks 2 protected in this way from the hammer knocks serving for embedding the identification device or from other attacks, such as prolonged exposure to ultraviolet radiation.

Finally, the identification device according to the invention, more specifically the element 5, can have, over the extent of and opposite the information marks 2, means 12 performing the function of guiding an appliance for reading the information marks 2.

These means 12 comprise a groove or a projection, the dimension of which is adapted to the reading appliance.

The invention is also aimed at optimizing the known principle of the identification of articles, especially piece of timber, by means of identification devices which can be incorporated in a complete data-processing unit.

The identification device of the invention can also be fastened to the article to be identified in the same way as a staple. Few identification devices are then put in a container of stappling machine. Each of them presents itself on its turn on the level of percussion's means. When the machine is suitably placed and that the percussion's means are acted an identification device is fastened to the article to be identified and an other device takes its place in the machine.

The invention therefore also relates to an information-processing device consisting, on the one hand, of the identification device, as described above, namely having information marks 2 of the bar-code type visible from the outer face of the identification device and protected against external attack, this identification device being placed against or inside each article to be identified, and, on the other hand, of an appliance making it possible to read the information marks 2.

This reading appliance is adapted to the particular type of information marks 2. In the preferred case where these signs are formed by bar-codes, the reading appliance is a pen-type code reader. When the information marks 2 are, for example, reliefs or recesses, the reading appliance is, for example, an optical reader. The various alternative forms can be applied to the various possible uses: article marking, badge, key.

Finally, the invention relates to an identification method intended for storing information corresponding to various articles and making use of the identification device described and the data-processing device. This identification method is put into practice in the following steps:

First of all, an identification device having information marks 2 visible from the outer face of the identification device and protected against external attack is affixed against or inside each article to be identified.

Subsequently, the user passes a reading appliance over the extent of the information marks 2 or fastens it temporarily to these. This reading appliance is as described above, that is to say adapted for the different information marks 2 which can be obtained according to the invention.

Finally, the information inscribed on the various identification devices is stored in a memory connected to the reading appliance for this purpose.

Of course, the stored information is processed in way.

This method thus makes it possible to identify different articles quickly and easily and also put the stored information to use.

Likewise, it can be seen that the identification device, as described, is not limited to plates for identifying pieces of timber or trees, etc., but also relates to badges, keyholders, etc.

What is claimed is:

1. An identification device for identifying pieces of timber, comprising:
   - a flat, rigid support having an outer face and an inner face and including fastening means for embedding said device in the piece of timber to be identified;
   - a flat element having an outer face and an inner face, at least a portion of said element being transparent, and said element being formed unitarily with said support and rigidly joined to said support at said outer face thereof; and
   - information marks affixed to and facing said inner face of said element, wherein said information marks are visible from said outer face of said element.

2. The identification device of claim 1, wherein said information marks comprise a bar code.

3. The identification device of claim 1, wherein all of said element is transparent.

4. The identification device of claim 1, wherein said information marks are located directly on said inner face of said element.

5. The identification device of claim 1, further comprising a flat label rigidly affixed under and against said inner face of said element, said label having a marking face and an unmarked face and said information marks being located on said marking face of said label.

6. The identification device of claim 5, further comprising adhesive means on said inner face of said element for joining said marking face of said label to said inner face of said element.

7. The identification device of claim 5, said marking face of said label having an adhesive thereon.

8. The identification device of claim 5, further comprising a flat plastic film affixed to said unmarked face of said label.

9. The identification device of claim 5, wherein said inner face of said element has recess means for receiving said label for setting apart said label from the surface of the piece of timber when said device is placed on the surface of the piece of timber.

10. The identification device of claim 1, wherein said support has outwardly extending manual holding tongue means for manually holding said device outside the striking zone of a hammer.

11. The identification device of claim 1, wherein said support has an outer contour and said fastening means are continuous and extend inwardly of said inner face of said support at said outer contour for embedding said device in the piece of timber to be identified, said fastening means defining a closed space.

12. The identification device of claim 11, wherein said fastening means comprises at least two tabs inserted in said inner face of said support.

13. The identification device of claim 1, wherein said element includes guiding means opposite and over said information marks for guiding an appliance for reading said information marks.

14. An identification device for identifying pieces of timber, comprising:
   - a flat, rigid support having an outer face, an inner face, an outer contour, manual holding tongue means for manually holding said device outside the striking zone of a hammer, and continuous fastening means extending inwardly of said inner face at said outer contour for embedding said device in the piece of timber to be identified, said inner face being adapted to be arranged against the piece of timber to be identified, and said fastening means defining a closed space and comprising at least two tabs inserted in said inner face;
   - a flat element having an outer face and an inner face, all of said element being transparent, and said element being formed unitarily with said outer face of said support;
   - information marks affixed to and facing said inner face of said element, wherein said information marks comprise a bar-code and are visible from said outer face of said element; and
   - a flat label rigidly affixed under and against inner face of said element, said label having a marking face and an unmarked face and said information marks being located on said marking face of said label;
   - wherein said flat element includes guiding means opposite and over said information marks for guiding an appliance for reading said information marks.

* * * * *

UNITED STATES PATENT AND TRADEMARK OFFICE
CERTIFICATE OF CORRECTION

PATENT NO. : 4,908,503

DATED : March 13, 1990

INVENTOR(S) : Bernard Leuvrey

It is certified that error appears in the above-identified patent and that said Letters Patent is hereby corrected as shown below:

On the title page item [76] change the name of the inventor from "Leuvrey Bernard" to --Bernard Leuvrey--.

Item [19] "Bernard" should read --Leuvrey--.

Signed and Sealed this

Twenty-sixth Day of March, 1991

*Attest:*

HARRY F. MANBECK, JR.

*Attesting Officer*

*Commissioner of Patents and Trademarks*